Dec. 9, 1924.                          1,518,279
C. H. SMOOT
FLUID METER
Filed March 19, 1924       2 Sheets-Sheet 1

Charles H. Smoot INVENTOR.
BY Knight Bro
ATTORNEYS

Dec. 9, 1924.

C. H. SMOOT

FLUID METER

Filed March 19, 1924    2 Sheets-Sheet 2

INVENTOR.
Charles H. Smoot
BY Knight Bro
ATTORNEYS

Patented Dec. 9, 1924.

1,518,279

UNITED STATES PATENT OFFICE.

CHARLES H. SMOOT, OF MAPLEWOOD, NEW JERSEY.

FLUID METER.

Application filed March 19, 1924. Serial No. 700,443.

*To all whom it may concern:*

Be it known that I, CHARLES H. SMOOT, a citizen of the United States, and a resident of Maplewood, county of Essex, State of New Jersey, have invented certain new and useful Improvements in Fluid Meters, of which the following is a specification.

My invention relates to means whereby a flow of fluid, elastic or not, steady or pulsating, is measured.

In carrying out my invention, I mechanically create a flow of liquid which is in direct ratio to the flow of fluid to be measured and I measure the flow of the liquid.

The several embodiments of my invention described hereunder will show the means I employ to create a rate of flow of liquid in direct ratio to the flow of fluid to be measured, means to measure the rate of liquid so created and means to apply said embodiments to compressible as well as incompressible fluids.

For a better understanding of my invention, however, and the advantages possessed by it, reference should be had to the accompanying drawings and description matter, in which I have illustrated and described the forms in which my invention may be embodied.

The various features of novelty characterizing my invention are pointed out in the claims annexed to and forming part of the specification.

Figure 1:
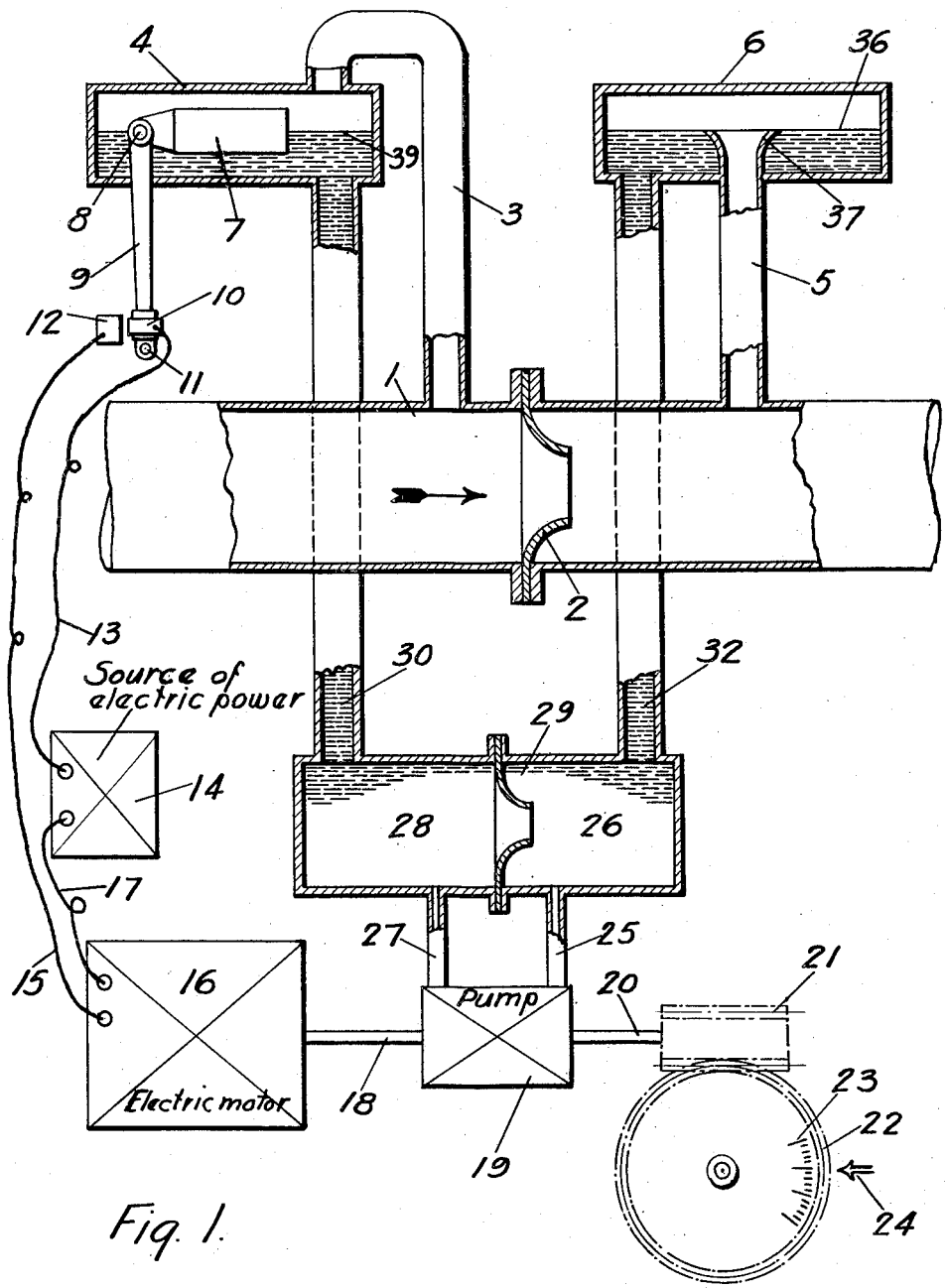
Figure 1 is a vertical diagrammatic view of an embodiment of my invention

In Figure 1, 1 is a pipe conveying fluid under pressure which is flowing through a streamline shaped orifice 2, located in the pipe 1. 3 is a pipe connecting pipe 1 to chamber 4. 5 is a pipe connecting the low pressure side of orifice 2 to chamber 6. 7 is a float, fulcrumed on rod 8, which passes through a gland in chamber 4. The extended end of fulcrum 8 is provided with lever 9, to the lower end of which is attached electrode 10, which is insulated and held by lever 9 through the agency of screw 11. 12 is a stationary electrode, disposed to make contact with electrode 10. 13 is a wire connected to source of electric power 14 and at its other end to electrode 10. 15 is an electric wire leading from electrode 12 to electric motor 16. 17 is an electric wire leading from source of electric power 14 to motor 16. 18 is an extended shaft of motor 16, connected to positive displacement pump 19. 20 is a further extension of the shaft, which is provided with worm gear 21, which meshes with gear wheel 22. 23 is a dial calibrated to read the quantity of fluid flowing through pipe 1, the reading being indicated by pointer 24. 25 is a pipe connecting water chamber 26 to inlet side of pump 19. 27 is a pipe connecting discharge side of pump 19 to chamber 28. 29 is a streamline orifice located between chambers 28 and 26. 30 is a pipe connecting chamber 4 with chamber 28. 32 is a pipe connecting chamber 26 to chamber 6. The upper end of pipe 5 enlarges to the inverted cone 37, whose upper edge is in line with the normal high level 36 of liquid in chamber 6. 39 is the normal level of liquid in chamber 4.

The operation of this embodiment of my invention is as follows:

The flow of fluid through pipe 1 produces a pressure difference which is in proportion to the square of the volume of fluid passing orifice 2. The higher pressure in pipe 1 is led through pipe 3 to the space in chamber 4 above the liquid level 39. Pipe 3 is of sufficient size to maintain the same pressure in chamber 4 during pulsations as exists in pipe 1. Similarly, pipe 5 is of ample area to bring the pressure from pipe 1 on the low pressure side of orifice 2 to chamber 6 and maintain in chamber 6 the same pressure as is present in the low pressure side of pipe 1. The liquid levels 39 and 36 are maintained approximately equal under normal conditions, the level of 39 being under the control of float 7 and electrodes 10 and 12. If the liquid level 39 is depressed, electrodes 10 and 12 make contact and electric motor 16 rotates, driving positive displacement pump 19, and by withdrawing water from chamber 26 and adding withdrawn water to chamber 28, restores liquid level 39 to normal position, or slightly above, whereby float 7 is elevated, electrodes 10 and 12 separated and motor 16 brought to rest. This action continues intermittently and occasionally with a small arc between electrodes 10 and 12, which gives reduced speed to motor 16 in such a way as to maintain the liquid level 39 always very close to its normal position. The pressure in chamber 4 is in excess of the pressure in chamber 6 by an amount equal to the pressure difference created by the fluid to be measured in flowing through orifice 2 in pipe 1 and this pressure difference is communicated to chambers 28 and 26 through pipes 30 and 32 in such a way as to maintain a pressure difference from chamber 28 to chamber 26 equal to the pressure difference across orifice 2. In consequence of this equality there is a flow of liquid through orifice 29, which flow is impelled by the same pressure as causes a flow of fluid through orifice 2 and subject to the same variations as exist for orifice 2. In consequence of this pressure equality the flow of liquid from chamber 28 through orifice 29 into chamber 26 is proportional to the flow of liquid through orifice 2. A flow of fluid from chamber 4 through orifice 29 lowers the liquid level 36 and causes motor 16 to drive pump 19 by an amount sufficient to bring liquid level 36 to its normal position, in consequence of which the amount of fluid passed by positive displacement pump 19 is maintained for intervals of time equal to the fluid which passes orifice 29. It is only sufficient for the purpose of this invention that the total liquid passed by pump 19 in an interval of, say, several minutes shall be equal to the total quantity of liquid passing orifice 29 in order that the revolutions of pump 19 may accurately integrate the quantity of fluid passing orifice 2. A lack of momentary balance between the speed of pump 19 and the rate of fluid flow through orifice 29 is possible because of the reservoir capacity of chambers 4 and 6. An excess of fluid passing orifice 29 over the amount returned by pump 19 results in a slight depression of liquid level 36 and corresponding elevation of liquid level 39, which lack of balance cannot last but a short period, however, before the change in position of float 7 and its motion on electrodes 10 and 12 causes motor 16 to drive pump 19 at a sufficient speed to restore the liquid levels 39 and 36 to their original position. In consequence of this action, the total revolutions of pump 19, which are counted by the counting gears 21 and 22, for time intervals, correctly measure the total fluid passing orifice 29, and therefore orifice 2, since the rate of flow through orifice 29 is accurately proportional to the rate of flow through orifice 2.

The embodiment of my invention shown in Figure 1 is especially adapted to measure steam flows in which there is a certain amount of condensation within pipes 3 and 5 and chambers 4 and 6, with a consequent accumulation of water within these chambers. The escape of such accumulated water is provided for by pipe 5 and opening 37. The liquid level 36, when it reaches opening 37, allows water to overflow into pipe 5. This overflow always maintains the liquid level 36 at the same maximum value, with slight variations below this maximum value, due to a lack of momentary equality between the flow of fluid through orifice 29 in one direction and pump 19 in the other direction. It will be seen from the above that pump 19 must displace a volume of fluid in direct proportion to the amount of fluid passing orifice 2 in a given time and that the indications of volume shown by the number of revolutions of pump 19 constitute an accurate measure of the fluid passing orifice 2. Furthermore, if the flow through orifice 29 is pulsating in an exactly similar manner to the pulsations on orifice 2, the quantity of fluid indicated by the revolutions of pump 19 is a correct indicative of the fluid passing orifice 2 and remains correct whether the fluid passing orifice 2 is a continuous flow or a pulsating flow. The positive displacement pump 19 acts as a meter, each revolution of the pump giving a known quantity of displaced liquid.

I have described an embodiment of my invention adapted to measure a flow of steam. My invention is not limited to this application, as further embodiments will show.

Figure 2:
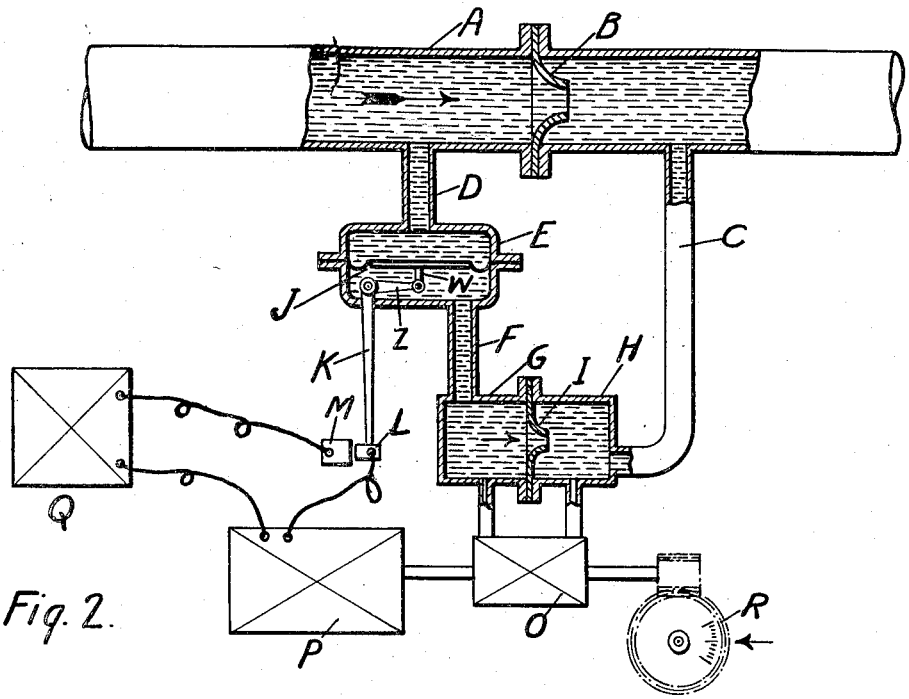
Figure 2 is a similar view of a modified form.

Figure 2 shows an embodiment of my invention adapted to measure a flow of liquid, such as water. In this embodiment it is not necessary to control the height of liquid level on either side of the orifice I, as the entire equipment is full of water.

A is the pipe through which the water to be measured is flowing. B is an orifice in the pipe A. E is a diaphragm chamber provided with movable diaphragm J, which is connected by link W and lever arm Z to contact arm K, whereby the electrode L is caused to move to and from the contact point M when the center of diaphragm J is displaced. Pipe C leads from pipe A to chamber H, while pipe F leads from chamber G to the lower half of diaphragm chamber E and pipe D connects to pipe A on the high pressure side of orifice B. O is a positive displacement pump, so disposed as to withdraw liquid from chamber H and discharge liquid into chamber G. Pump O is driven by electric motor P from source of electric power Q and includes in its power circuit the contact points L and M.

The operation of this embodiment of my invention is as follows:

The pressure difference across orifice B in pipe A, due to the flow of fluid, is communicated to either side of orifice I and causes a flow of liquid from chamber G to H. Diaphragm J is freely flexible and does not interpose any material resistance to the flow of fluid from pipe A through pipe D, and by displacing the freely movable diaphragm J causes a corresponding flow of fluid from diaphragm chamber E through pipe F to chamber G. The displacement of diaphragm J actuates contacts L and M, causing motor P to drive pump O at a sufficient displacement to maintain the diaphragm J at a point where the contacts L and M are in contact or separated. This results in the pump O passing a volume of fluid which, for a moderate interval of time, is identical to the quantity of fluid passing the orifice I in the same time interval and which is in turn propelled by the pressure drop through the orifice B.

It will be seen that the quantity of liquid contained in chamber G, pipe F and that portion of diaphragm chamber E underneath diaphragm J is always maintained constant by the action of pump O, restoring to this space an amount of liquid equal to that which passes the orifice I, the pump O supplying always to the high pressure side of orifice I a quantity of liquid equal to that just passed through the orifice from chamber G to chamber H. As a result of this the flow of fluid through the pump is a direct measure of the flow of fluid through orifice B and may be indicated by the speed counter R. Any other means of indicating the flow of fluid through the pump O would equally well serve the purpose, as for example, a water meter could equally well be inserted in the pipe connections to pump O, thus indicating the volume of fluid passing pump O and therefore the volume passing orifice B. R is a revolution counter.

Figure 3:
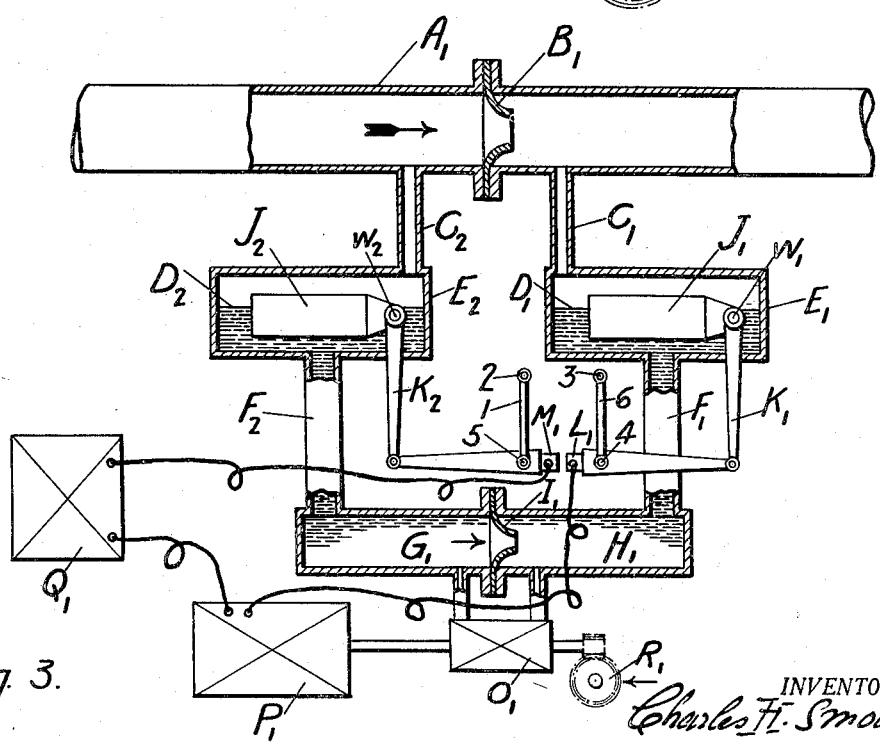
Figure 3 is another similar view of another modification.

A third embodiment of my invention is shown in Figure 3, wherein it is adapted to measure a flow of gas. Under these conditions there is no fluid supply contained within the gas to maintain a suitable liquid upon which the pump may actuate and it is desirable to use a given quantity of oil or water, which is inserted in the apparatus for this purpose. The quantity of liquid so employed may vary from time to time, due to evaporation, and it is therefore advisable to compensate for changes in the quantity of fluid employed. I accomplish this compensation by the use of two floats.

In Figure 3, $A^1$ is a pipe conveying the gas to be measured. $B^1$ is the orifice. $Q^1$ is a source of electric power. $P^1$ is an electric motor driving pump $O^1$ and revolution counter $R^1$. $C^1$ and $C^2$ are pipes leading to float chambers $E^1$ and $E^2$, containing floats $J^1$ and $J^2$, which are connected through fulcrums $W^1$ and $W^2$ to the lever arms $K^1$ and $K^2$, to the lower end of which are articulated two movable electric contact points $M^1$ and $L^1$, which are included in the electric power circuit of motor $P^1$. $F^1$ and $F^2$ are pipes leading from float chambers $J^1$ and $J^2$ to either side of the metering orifice $I^1$, $D^1$ and $D^2$ indicate the level of liquid in the chambers $E^1$ and $E^2$.

The operation of this embodiment of my invention is essentially the same as described and illustrated in Figure 1, with the exception that a change in the quantity of liquid contained in chambers $E^1$ and $E^2$, $G^1$ and $H^1$, are automatically compensated for by the action of the floats $J^1$ and $J^2$. It will be seen that if the levels of liquid $D^1$ and $D^2$ be raised, floats $J^1$ and $J^2$ will be raised, arms $K^1$ and $K^2$ will be rotated to the left, and contact points $M^1$ and $L^1$ will be moved to the left an equal amount, maintaining their relative position as it was prior to the change in liquid level $D^1$ and $D^2$. This permits the pump $O^1$ to meter the flow of liquid through orifice $I^1$ by counting its revolutions on the counter $R^1$ and maintain a pressure difference across orifice $I^1$ between chambers $G^1$ and $H^1$ which is equal to the pressure difference across orifice $B^1$ and remains equal even though the quantity of liquid indicated by levels $D^1$ and $D^2$ be altered, since a change in level of liquid moves simultaneously contact points $L^1$ and $M^1$ in the same direction, preserving their position with reference one to the other the same when the liquid levels $D^1$ and $D^2$ are equal to each other, but raised or lowered by changes in quantity of fluid in the apparatus.

In order to obtain a parallel motion of the two movable contact points $M^1$ and $L^1$, arms 1 and 6, which pivot around stationary pins 2 and 3, are connected to the movable electric contact points $M^1$ and $L^1$ by pins 5 and 4.

In fluid meters as made heretofore, the construction is admittedly such that they cannot correctly integrate a fluid flow which is not substantially constant and subject only to slow variations. With my apparatus this difficulty is overcome and the apparatus correctly integrates the total quantity of fluid even though the flow be not continuous and is of a pulsating character, such as the amount of steam flowing through a pipe to a reciprocating steam engine.

From the above it will be seen that the embodiment of my invention shown in Figure 1 consists essentially of submitting respectively each of two interconnected columns of liquid to a pressure difference created in the flow of fluid to be measured. At the point where the columns of liquid are interconnected, I insert a calibrated orifice in such a manner that I can measure the amount of liquid flowing through this orifice under the influence of the pressure difference created in the fluid to be measured. The amount flowing through this orifice is carried around it or short-circuited in such a manner that I maintain the columns of liquid on an even level. As is well-known, the amount of liquid passing through the orifice is in direct ratio to the amount of fluid which is to be measured.

The embodiment of my invention shown in Figure 2 describes my apparatus as applied to the measurement of a flow of liquid. It will be seen that pump O is to maintain constant the volume comprised between diaphragm J and orifice I.

The embodiment of my invention shown in Figure 3 discloses means to take care of the evaporation of the liquid circuited around orifice $I^1$.

While I have described in detail and illustrated in the drawings specific embodiments of my invention, showing it in forms as now preferred by me, I do not desire to be limited to the specific details as herein set forth, since my invention is broader than such specific embodiments, as pointed out by the appended claims.

I claim:—

1. The process of metering a flow of fluid which consists in creating a pressure difference in the flow of the fluid, applying the high pressure of said pressure difference to a column of liquid interconnected with a second column of liquid, applying the lower pressure of said pressure difference to the liquid level of the second column of liquid, pumping the liquid flowing from one column of liquid to the other under the fluid pressure difference and measuring the amount of liquid pumped.

2. In a meter for a flow of fluid means to create a pressure difference in the flow of fluid two interconnected columns, means to apply said different pressures respectively to the levels of liquid in the two interconnected columns, restricted means in the path of the liquid, pumping means to return and measure the liquid flowing through said restricted means under the action of the different pressures.

3. In combination, means to create a pressure difference in flow of fluid to be metered, a fluid meter comprising a first chamber containing a liquid, restricted means located in said first chamber, two pipes containing liquid connected to said first chamber one on either side of said restricted means, two chambers, each of which is located at the upper end of said pipes and containing liquid, means to apply the high pressure of the pressure difference to one of the two chambers and the low pressure of the pressure difference to the second of the aforesaid chambers, floats controlled by the liquid levels in the said two upper chambers, electric means operated by said floats and driving a pump displacing the liquid contained in the first chamber from one side to the other of the restricted means located therein, and means to integrate the pump displacement of liquid.

4. In combination, means to create a pressure difference in flow of fluid to be metered, a fluid meter comprising two columns adapted to contain liquid interconnected by means of a chamber containing a restricted means, means to apply the high pressure of a pressure difference created in the flow of fluid to be metered to one of the columns of liquid and the low pressure of the pressure difference to the second column of liquid and means to return and measure to the high pressure column the liquid displaced by the pressure difference.

5. In combination, means to create a pressure difference in flow of fluid to be metered, a steam meter comprising two columns adapted to contain liquid interconnected by means of a chamber containing a restricted means, means to apply the high pressure of a pressure difference created in the flow of steam to be metered to one of the columns of liquid and the low pressure of the pressure difference to the second column of liquid, means to return and measure to the high pressure column the liquid displaced by the pressure difference and means to remove the condensed steam.

6. In combination, means to create a pressure difference in a liquid flow, a meter for a liquid flow comprising two interconnected columns adapted to contain liquid subjected each to the high and low pressure of the pressure difference respectively, a diaphragm interposed in one of said columns, a restricted means interposed between said columns and means controlled by the motion of said diaphragm to pump the liquid from one side to the other of said restricted means.

7. In a meter for a flow of fluid, means to create a pressure difference in the flow of fluid two interconnected columns, means to apply said pressure difference to the levels of liquid in the two interconnected columns, a restricted means in the path of the liquid, pumping means to return and measure the liquid flowing through said restricted means under the action of the pressure difference and means to compensate for evaporation of the liquid.

CHARLES H. SMOOT.